US011533597B2

(12) United States Patent
Kim

(10) Patent No.: US 11,533,597 B2
(45) Date of Patent: Dec. 20, 2022

(54) METHOD FOR PROCESSING MESSAGE IN M2M SYSTEM AND DEVICE THEREFOR

(71) Applicant: Samsung Electronics Co., Ltd., Suwon-si (KR)

(72) Inventor: Sang-eon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 16/626,280

(22) PCT Filed: Jun. 22, 2018

(86) PCT No.: PCT/KR2018/007070
§ 371 (c)(1),
(2) Date: Dec. 23, 2019

(87) PCT Pub. No.: WO2018/236179
PCT Pub. Date: Dec. 27, 2018

(65) Prior Publication Data
US 2020/0120464 A1   Apr. 16, 2020

(30) Foreign Application Priority Data

Jun. 23, 2017  (KR) .......................... 10-2017-0079775
Jun. 28, 2017  (KR) .......................... 10-2017-0082083
(Continued)

(51) Int. Cl.
*H04W 4/70* (2018.01)
*H04W 12/033* (2021.01)

(52) U.S. Cl.
CPC ........... *H04W 4/70* (2018.02); *H04W 12/033* (2021.01)

(58) Field of Classification Search
CPC ...... H04W 4/70; H04W 12/033; H04L 67/32; H04L 67/16; H04L 67/34
See application file for complete search history.

(56) References Cited

U.S. PATENT DOCUMENTS

2016/0234691 A1* 8/2016 Jeong .................. H04W 12/086
2018/0205804 A1* 7/2018 Kim ..................... H04L 12/5601

FOREIGN PATENT DOCUMENTS

CN         109428768 A  *  3/2019
KR    10-2016-0082967 A     7/2016
(Continued)

OTHER PUBLICATIONS

ISA/KR, International Search Report and Written Opinion of the International Searching Authority, International Application No. PCT/KR2018/007070, dated Sep. 20, 2018.
(Continued)

*Primary Examiner* — Mohammed Waliullah

(57) ABSTRACT

The present embodiment relates to a machine-to-machine communication (M2M) technique, and to a method for a receiver processing a request message sent by a transmitter, and a device therefor. One embodiment provides a method and a device for an M2M device processing a message, the method comprising the steps of: receiving, from another M2M device, a request message including an operation parameter, a receiving-side parameter, a transmitting-side parameter and a request identification parameter; processing, according to an operation indicated by the operation parameter, a resource being processed including attribute information for indicating resource information; and transmitting a response message including response information for the request message.

12 Claims, 17 Drawing Sheets

(30) Foreign Application Priority Data

Jul. 6, 2017  (KR) ........................ 10-2017-0086171
Jun. 21, 2018  (KR) ........................ 10-2018-0071308

(56) References Cited

FOREIGN PATENT DOCUMENTS

| | | | | |
|---|---|---|---|---|
| KR | 10-2017-0001942 A | 1/2017 | | |
| KR | 10-2017-0007691 A | 1/2017 | | |
| KR | 10-2017-0010300 A | 1/2017 | | |
| KR | 10-2017-0052477 A | 5/2017 | | |
| WO | WO-2009125961 A1 * | 10/2009 | ............. | H04N 19/00 |

OTHER PUBLICATIONS

Korean Intellectual Property Office, "Office Action," Application No. KR 10-2018-0071308, dated Jun. 20, 2019, 9 pages.
Korean Intellectual Property Office, "Decision of Patent," Application No. KR 10-2018-0071308, dated Oct. 28, 2019, 8 pages.

* cited by examiner

FIG. 6

600
```
{
    "rqp": {
        "to": "//example.net/C190XX7T,
        "fr": "C2345",
        "op": 1,
        "rqi": "A1234",
        "rt": 30,
        "pc": {
            "m2m:tsi" : {
            "rn" : "car",
            "lbl" : "speed",
            "dgt" : "20170616T112032",
            "con" : {
                    "thing" : "car"
                    "status" : "drive"
                    "speed" : "100"
            },
               "snr" : 300
            }
        }
    }
}
```

605
```
{
   "rsp" : {
        "rsc" : 2001,
        "rqi" : "A1234"
    }
}
```

650
```
{
    "rqp": {
        "to": "//example.net/C190XX7T/timeSeriesInstance",
        "fr": "C4385",
        "op": "2",
        "rqi": "A1246"
    }
}
```

655
```
{
    "rsp": {
        "rsc": "2000",
        "rqi": "A1246",
        "PC": {
            "m2m:tsi" : {
                "ty" : 30,
                "ri": "//example.net/C190XX7T/timeSeriesInstance",
                "rn" : "car",
                "pi" : "C190XX7T/timeSeriesInstance",
                "lbl" : "speed",
                "ct" : "20170616T112032",
                "et": "20220616T112032",
                "lt": "20170616T112032",
                "dgt": "20170616T112032",
                "con": {
                        "thing" : "car",
                        "status" : "drive",
                        "speed" : 100
                },
                 "snr" : 300
            }
        }
    }
}
```

FIG. 7

| | DATA MANAGEMENT TYPE | DATA INFORMATION |
|---|---|---|
| Case A | Media type is "application/json"<br>Encoding type is "Plain"<br>contenSecurity is none | {<br>  "thing" : "car"<br>  "status" : "drive"<br>  "speed" : "100"<br>} |
| Case B | Media type is "application/json"<br>Encoding type is "Base64"<br>contenSecurity is none | ew0KCSJ0aGluZyI6ICJIYXIiLAOKCSJzdGF0dxMiOiAiZHJpdm<br>UiAOKCSJzcGVIZCI6ICIxMDAiDQp9 |
| Case C | Media type is "application/xml"<br>Encoding type is "Plain"<br>contenSecurity is none | <con><br>  <thing>car</thing><br>  <status>drive</status><br>  <speed>100</speed><br></con> |
| Case D | Media type is "application/XML"<br>Encoding type is "Base64"<br>contenSecurity is none | PGNvbj4NCgk8dGhpbmc+Y2FyPC90aGluZz4NCgk8c3RhdH<br>VzPmRyaXZlPC9zdGF0dXM+DQo.IPHNwZWVkPjEwMDwvc3<br>BlZWQ+DQo8L2Nvbj4= |
| Case E | Media type is "text/csv"<br>Encoding type is "Plain"<br>contenSecurity is none | car, drive, 100 |
| Case F | Media type is "text/csv"<br>Encoding type is "Base64"<br>contenSecurity is none | Y2FyLCBkcmI2ZSwgMTAw |

FIG. 10

```
{
    "rqp": {
        "to": "//example.net/C190XX7T/timeSeriesInstance",
        "fr": "C4385",
        "op": "2",
        "rqi": "A1246"
    }
}
```

FIG. 11

```
{
    "rsp": {
        "rsc": "2000",
        "rqi": "A1246",
        "pc": {
          "m2m:tsi" : {
            "ty": "30",
            "ri": "//example.net/C190XX7T/timeSeriesInstance",
            "rn" : "car",
            "pi": "C190XX7T/timeSeriesInstance",
            "lbl" : "speed",
            "ct": "20170616T112032",
            "et": "20220616T112032",
            "lt": "20170616T112032",
            "dgt": "20170616T112032",
            "con":
ewOKCSJOaGluZyI6ICJJYXIiLAOKCSJzdGFOdXMiOiAiZHJpdm
UiAOKCSJzcGVlZCI6ICIxMDAiDQp9
            "snr" : 300
          }
        }
    }
}
```

METHOD FOR PROCESSING MESSAGE IN M2M SYSTEM AND DEVICE THEREFOR

CROSS-REFERENCE TO RELATED APPLICATIONS

This application is a 371 National Stage of International Application No. PCT/KR2018/007070, filed Jun. 22, 2018, which claims priority to Korean Patent Application No. 10-2017-0079775, filed Jun. 23, 2017, Korean Patent Application No. 10-2017-0082083, filed Jun. 28, 2017, Korean Patent Application No. 10-2017-0086171, filed Jul. 6, 2017, and Korean Patent Application No. 10-2018-0071308, filed Jun. 21, 2018, the disclosures of which are herein incorporated by reference in their entirety.

BACKGROUND

1. Field

The disclosure relates to a machine-to-machine communication (M2M) technology and, more particularly, to a method and an apparatus for processing a message, which a transmitter transmits, by a receiver.

2. Description of Related Art

Communication of things (machine-to-machine communication (M2M), machine-type communication (MTC), smart device communication, machine-oriented communication, or Internet of things) refers to all types of communication schemes in which communication is performed without intervention of a person in a communication process.

In general, M2M does not directly communicate with a person and does not perform application control, and thus needs a transmission/reception method and procedure in order to exchange messages between objects. Further, for smooth message exchange between M2M devices, a protocol is needed.

Particularly, according to popularization of IoT devices, a plurality of M2M devices are used within homes and offices, and the M2M devices perform the same or similar functions for a predetermined purpose.

In such a situation, a plurality of M2M devices may store, manage, and process data through different protocols. For example, respective M2M devices may manage, transmit, and receive data using different media types or encoding types. Accordingly, M2M devices using different encoding types may have difficulty in smoothly exchanging information therebetween.

That is, it is required to process information on data processing types for smooth information exchange between M2M devices having different data processing types. Further, a detailed technology for more rapidly extracting information from a message is needed.

SUMMARY

An embodiment made under the background proposes a detailed method and apparatus for, if an M2M device receives a request message from another M2M device, increasing efficiency of information exchange by separately managing data-type information for processed resources according to the corresponding request message.

Solution to Problem

In accordance with an aspect of the disclosure, a method of processing a message by a machine-to-machine communication (M2M) device is provided. The method includes: receiving a request message including an operation parameter, a receiving side parameter, a transmitting side parameter, and a request identification parameter from another M2M device; processing target resources including attribute information indicating resource information according to an operation indicated by the operation parameter; and transmitting a response message including response information for the request message.

In accordance with another aspect of the disclosure, a machine-to-machine communication (M2M) device for processing a message is provided. The M2M device includes: a reception unit configured to receive a request message including an operation parameter, a receiving side parameter, a transmitting side parameter, and a request identification parameter from another M2M device; a controller configured to process target resources including attribute information indicating resource information according to an operation indicated by the operation parameter; and a transmission unit configured to transmit a response message including response information for the request message.

Advantageous Effects of Invention

The disclosure provides an effect of more rapidly and efficiently extracting data through a message transmitted and received between different M2M devices.

Further, the disclosure provides an effect of preventing occurrence of errors of the entire M2M system due to ambiguity of a data processing type.

BRIEF DESCRIPTION OF THE DRAWINGS

FIG. 6 illustrates an example of a message code and a response message code based on an operation parameter of a request message according to an embodiment;

FIG. 7 illustrates a content processing method variously expressed according to a data processing method;

FIG. 10 illustrates an example of a code of a request message for retrieving <timeSeriesInstance> resources according to an embodiment;

FIG. 11 illustrates an example of a code of a response message for the request message of FIG. 10 according to an embodiment;

DETAILED DESCRIPTION

Figure 1:
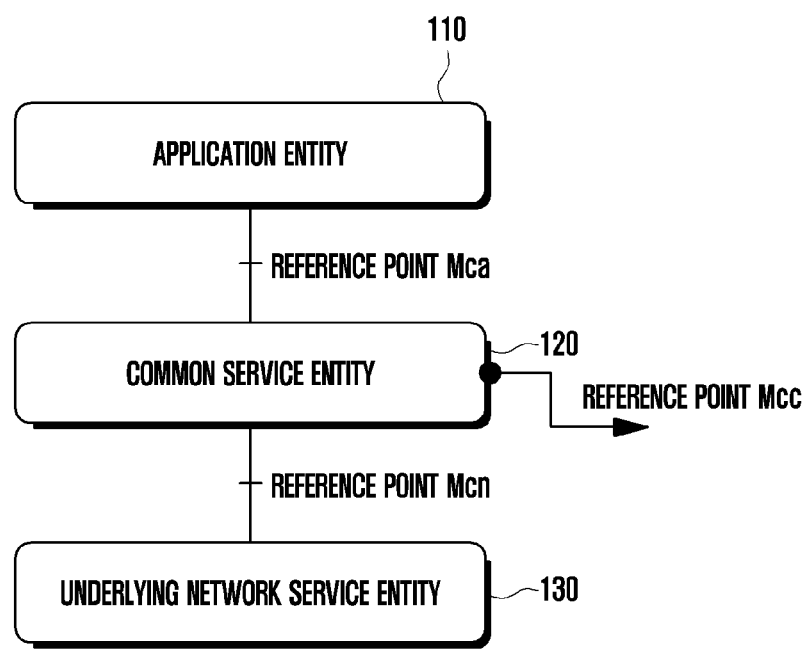
FIG. 1 illustrates an M2M system in a functional aspect of a higher level.

Hereinafter, exemplary embodiments of the disclosure will be described with reference to the accompanying drawings. In adding reference numerals to elements in each drawing, the same elements will be designated by the same reference numerals, if possible, although they are shown in different drawings. Further, in the following description of the disclosure, a detailed description of known functions and configurations incorporated herein will be omitted when it is determined that the description may make the subject matter of the disclosure rather unclear.

In addition, terms, such as first, second, A, B, (a), (b) or the like may be used herein when describing components of the disclosure. These terms are merely used to distinguish one structural element from other structural elements, and a property, an order, a sequence and the like of a corresponding structural element are not limited by the term. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Embodiments of the disclosure are described mainly based on communication of things. The communication of things may be called various terms such as machine-to-machine communication (M2M), machine-type communication (MTC), Internet of things (IoT), smart device communication (SDC), and machine-oriented communication (MOC). Recently, oneM2M presents many technical matters related to M2M communication. M2M communication refers to various communication performed without intervention of a person in a communication process. M2M communication is divided into an energy field, an enterprise field, a healthcare field, a public service field, a residential field, a retail field, a transportation field, and other fields. The disclosure includes the fields and can be applied to other fields.

FIG. 1 illustrates an M2M system according to an embodiment in a functional aspect of a higher level.

An application entity (AE) 110 provides an application service logic for end-to-end M2M solutions. For example, the application service logic includes a fleet tracking application, a remote blood sugar monitoring application, or a remote power metering and controlling application.

A common services entity (CSE) 120 provides a collective service function required in common for an energy field, an enterprise field, a healthcare field, a public service field, a residential field, a retail field, a transportation field, and other fields.

The service function may become different functions through reference points such as Mca and Mcc, and uses an underlying network service based on the reference point Mcn. For example, the common services entity may be data management, device management, M2M subscription management, and a location service. A subfunction provided by the CSE may be logically understood as a common service function (CSF). Some of the CSFs within the CSE of a oneM2M node may be mandatory and some may be optional. Similarly, sub functions within the CSFs may be also mandatory or optional.

An underlying network service function (NSF) 130 provides services to the common service entity. For example, the services include device management, location services, and device triggering.

Reference points are supported by the common service entity (CSE), and the reference point Mca indicates a reference point for providing M2M between an application entity and a common service entity. The reference point Mcc is a reference point for providing M2M between two common service entities. The reference point Mcn is a reference point for providing M2M between a common service entity and one network service entity.

More specifically, the reference point Mca allows one application entity (AE) to use the services supported by the common service entity. The services provided through the reference point Mca may be dependent on the functions provided by the communication service entity, and the application entity and the common service entity may exist in the same physical entity or separately exist in different physical entities. The reference point Mcc allows a common service entity that desires to use a service of another common service entity that provides a required function to use the service. The services provided through the reference point Mcc are dependent on the functions provided by the common service entity. The reference point Mcc may be supported between different M2M nodes. The reference point Mcn allows a common service entity that desires to use an underlying network service entity that provides a required function to use it, and provides services other than transport and connectivity. An instance of the reference point Mcn is implemented to be dependent on the services provided by the underlying network. Information exchange between two physical M2M nodes may use underlying network transport and connectivity services that provide basic services.

In the specification, the common service entity may be described as the CSE and the network service entity may be described as the NSE. Further, in the specification, the M2M device may be a CSE, an AE, a device including a CSE or an AE, or a device or a terminal included in the M2M system.

Figure 2:
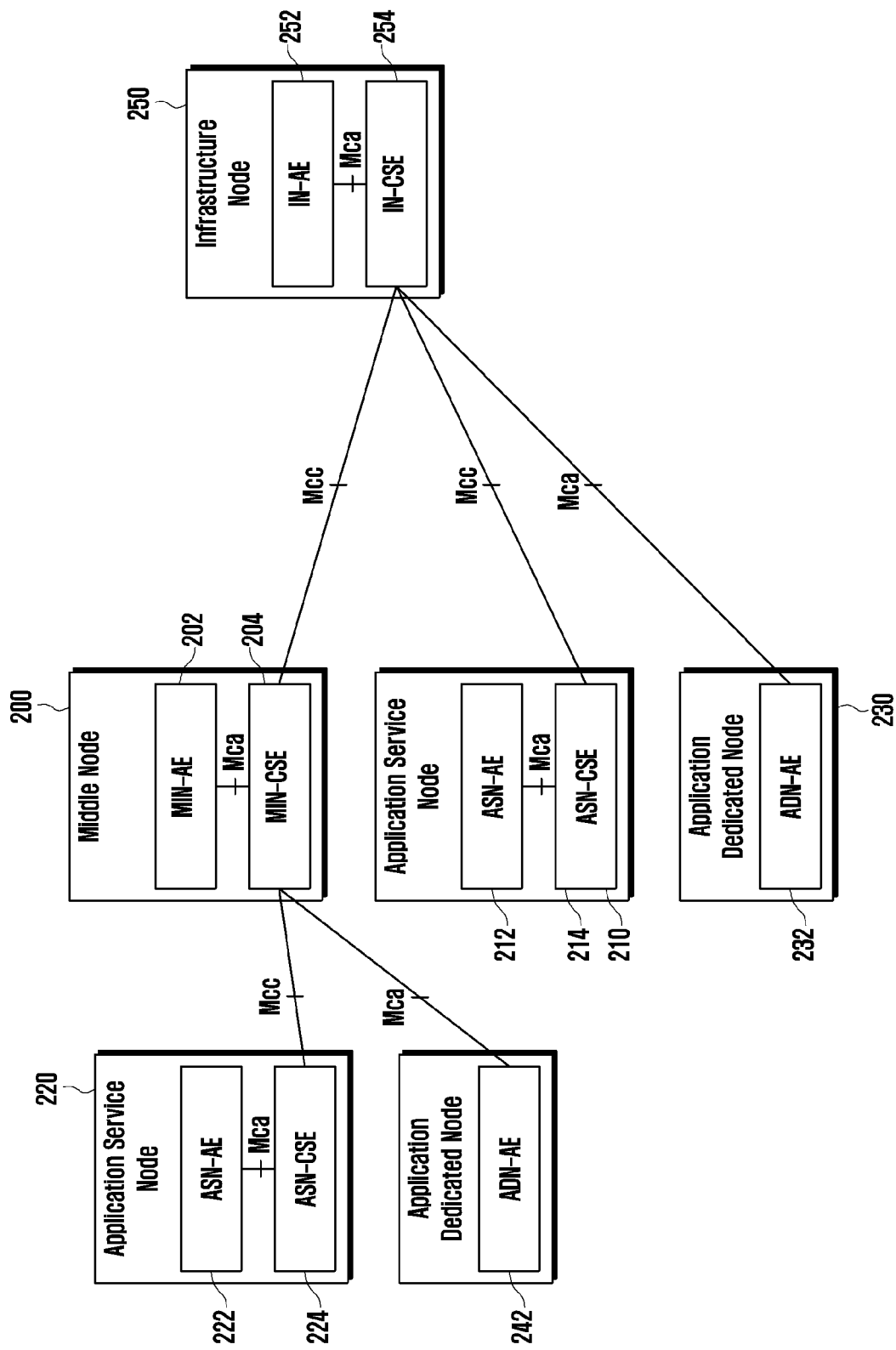
FIG. 2 is a block diagram of the M2M system according to an embodiment in more detail.

FIG. 2 illustrates a configuration of the M2M system according to an embodiment in more detail;

Referring to FIG. 2, an infrastructure node 250 performs a server function necessary for providing M2M. The infrastructure node 250 includes an infrastructure node application entity (AE) 252 and an infrastructure node common service entity (CSE) 254. The infrastructure node common service entity 254 is configured using various resources. The infrastructure node application entity 252 and the infrastructure node common service entity 254 are distinguished through the reference point Mca, and are used to configure and process a request message and a response message for creating, deleting, updating, retrieving, or notifying a message required for M2M, particularly, scheduler resources.

A middle node 200 relays M2M, Internet of things, or functions of M2M between the application service node 220 and the infrastructure node 250. The middle node 200 includes a middle node application entity 202 and a middle node common service entity 204. The middle node common service entity 204 is configured using various resources. The middle node application entity 202 and the middle node common service entity 204 are distinguished through the reference point Mca, and the infrastructure node common service entity 254 and the middle node common service entity 204 are distinguished through the reference point Mcc, and the entities are used to configure and process a request message and a response message for creating, deleting, updating, retrieving, or notifying a message required for M2M, particularly, scheduler resources.

An application service node 210 may include an application entity 212 and a middle node common service entity 214. The application entity 212 processes an application function required for a purpose of the device. The common service entity 214 of the application service node 210 is configured using various resources. The application entity 212 and the common service entity 214 are distinguished through the reference point Mca, and the common service entity 214 and the infrastructure node common service entity 254 are distinguished through the reference point Mcc, and the entities are used to configure and process a request message and a response message for creating, deleting, updating, retrieving, or notifying a message required for M2M, particularly, scheduler resources. Meanwhile, the application service node 220 may perform the M2M function with the infrastructure node 250 via the middle node 200. A difference between the application service node 210 and the application service node 220 is a communication interface configuring the node. For example, the application service node 220 communicates with reference numeral 100 using an interface capable of performing super near-field communication such as Bluetooth, ZigBee, Zwave, and Wi-Fi via the middle node 200. On the other hand, the application service node 210 communicates with the infrastructure node 250 using a communication interface such as 3G, LTE, 5G, Ethernet, Gigabit Ethernet, and ADSL.

Application-dedicated nodes 230 and 240 have no common service entity and have only an application entity 242 for M2M. The application-dedicated node 230 communicates with the infrastructure node 250 using a communication interface such as LTE, Ethernet, Gigabit Ethernet, and ADSL, and the application-dedicated node 240 communicates with the infrastructure node 250 using an interface capable of performing super near-field communication such as Bluetooth, ZigBee, Zwave, and Wi-Fi via the middle node 200.

As illustrated in FIG. 2, the M2M system may include one or more of the infrastructure node, the middle node, the application service node, and the application-dedicated node, and each node may include the CSE or the AE. Each of the CSE and the AE may communicate with another CSE or AE through a reference point.

Figure 3:
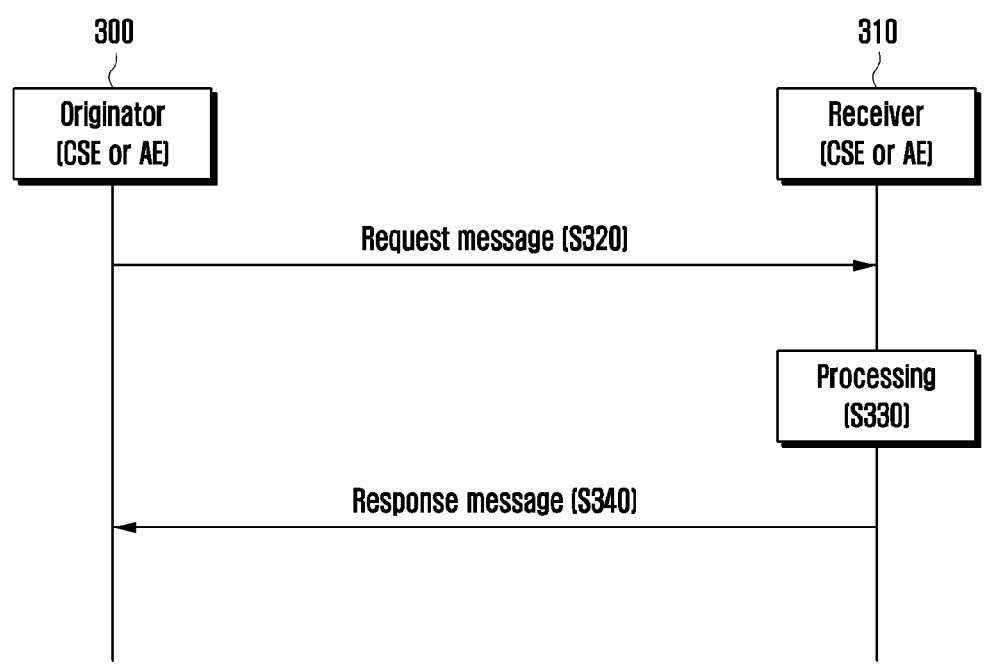
FIG. 3 illustrates an example of a procedure for transmitting a request message and receiving response information according to thereto in the M2M system.

Referring to FIG. 3, an originator 300 transmits a request message to a receiver 310 in S320. Each of the originator 300 and the receiver 310 may be an M2M device, or the CSE or the AE as described above. Further, each of the originator 300 and the receiver 310 may be a node, a server, or a device including the CSE or the AE.

The request message may include one or more parameters. For example, the request message may include a necessary parameter and a selective parameter. For example, a transmitting side parameter (From), a receiving side parameter (To), a request identifier information parameter (Request Identifier), and an operation parameter (Operation) are necessary parameters. The parameter From includes information on an originator who transmits a message, and the parameter To includes information on a receiver who receives a message. The parameter Request Identifier includes unique identification information for identifying a corresponding request message. The parameter Operation includes information for identifying an operation requested by a request message. The operation parameter may be configured as one of Create, Retrieve, Update, Delete, and Notify. Further, the selective parameter may be added to control various operations of the request message. For example, a selective parameter of a response type may designate a processing scheme of the receiver to a blocking (blockingRequest) scheme, a synchronized non-blocking (nonBlockingRequestSynch) scheme, asynchronous non-blocking (nonBlockingRequestAsynch) scheme, or a receiver-customized (flexBlocking) scheme.

Upon receiving the request message, the receiver 310 performs an operation for processing the corresponding request message in S330. For example, the receiver 310 may identify whether the originator 300 transmitting the request message has a right to process the corresponding request. If it is determined that the originator 300 has the right to process the request, the receiver processes the request message after identifying whether there is a requested resource which is a target to be requested. Alternatively, the receiver 310 may perform a corresponding operation according to the operation parameter of the request message. For example, if a subscription function indicating, when the operation parameter is configured as "create", and change, addition, or deletion of specific data is generated, provision of the same to the originator 300 is configured, the receiver 310 may generate subscription information. If data corresponding to the corresponding subscription information has a change, addition, or deletion event, the receiver 310 may inform the originator 300 of the same.

The receiver 310 generates processing result information according to the request operation, inserts the generated processing result information into a response message, and transmits the response message to the originator 300 in S340. Step S340 may be performed before step S330. That is, upon receiving the request message, the receiver 310 may generate an ACK response message simply indicating reception of the request message, transmit the ACK response message to the originator 300, and then perform step S330 to process the request message.

Figure 4:
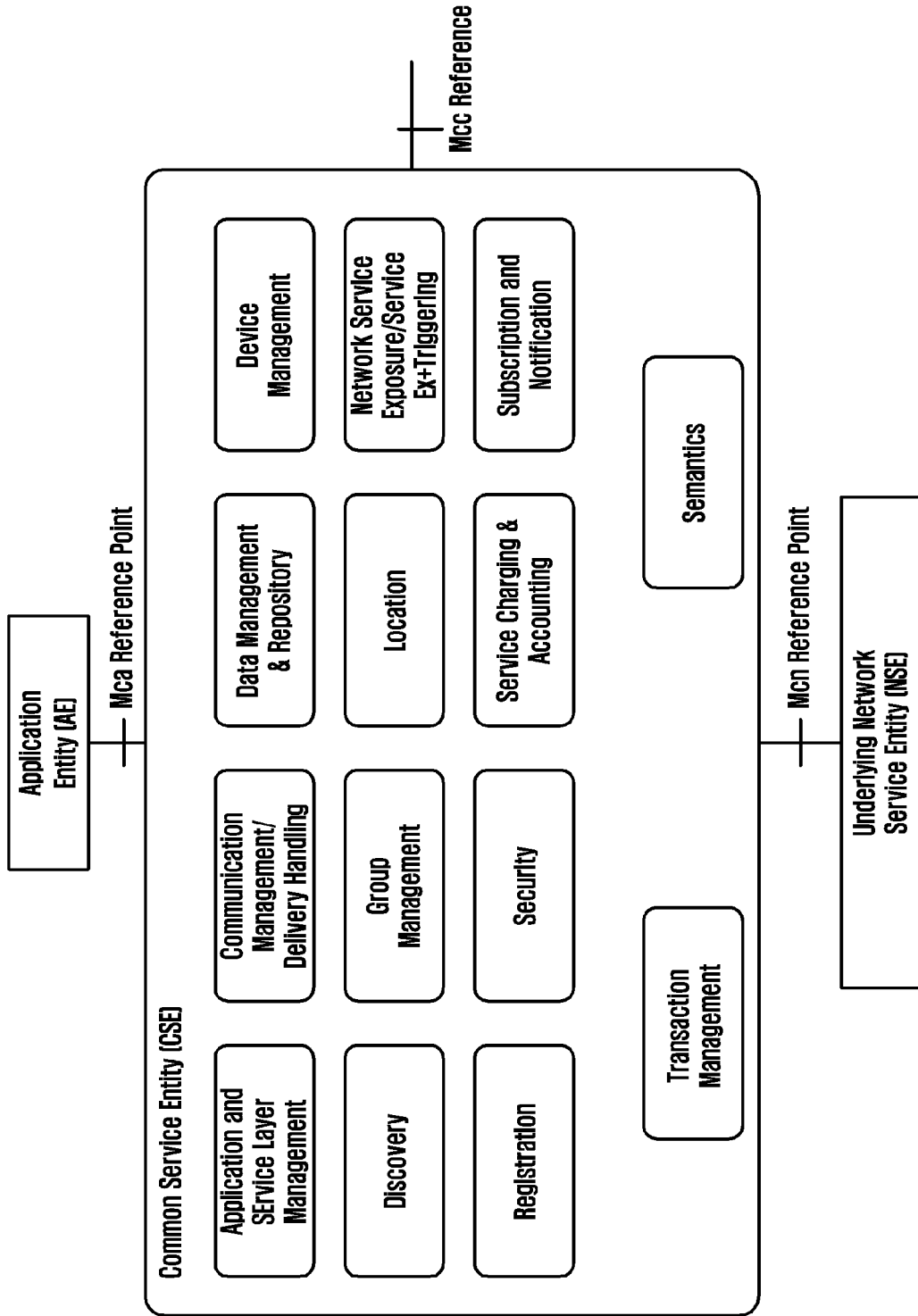
FIG. 4 illustrates a functional structure of a common service entity according to an embodiment.

FIG. 4 is a block diagram illustrating a common service entity according to an embodiment of the disclosure. The common service entity in FIG. 4 includes a function of processing identification information.

As illustrated in FIG. 4, functions provided by the common service entity include addressing and identification, application and service layer management, data management and repository, location, security, communication management/delivery handling, registration, service session management, device management, subscription/notification, connectivity management, discovery, service charging/accounting, network service exposure/service execution and triggering, and group management.

Of course, the functions may include semantics, data analytics, application enablement, and network service function management as well as the above functions.

Each of the functions is described below.

Application and service layer management (ASM) serves to manage the AE and the CSE of the ADN, ASN, MN, and IN and includes a configuration of the CSE, troubleshooting, an upgrade function, and an upgrade of the AE.

Communication management and delivery handling (CMDH) takes responsibility for communication between different CSEs, AEs and NSEs. The CMDH is responsible for determining at which time and using which communication connection the communication will be transferred, determining when the communication is needed and allowed, and storing a communication request when the transfer of communication is delayed until later. The CMDH is performed according to a provisioned policy specified for each request for communication and a delivery handling parameter. In communication using the underlying network data transmission service, the underlying network may support the same delivery handling function. In this case, the CMDH may use the underlying network, and operate as a front end of the underlying network to access the same delivery handling function.

Data management and repository (DMR) may allow an M2M application to exchange data with another entity. A DMR CSF provides a data storage space and provides a function for controlling the same. Further, the DMR CSF includes a function of collecting and combining a large amount of data, changing the data into a particular format, or analyzing and storing the data for semantic processing. "Data" may refer to raw data transparently extracted from the M2M device or processed data calculated or combined by the M2M entity. The collection of a large amount of data is known as a big data storage function.

A DMG (Device Management) CSF serves to manage device functions of devices in an MN, a device node, and an M2M area network. Devices that provide one or more following functions can be managed. The functions include installation and settings of application software, configuration settings and provisioning, firmware update, logging, monitoring, analysis, management of topology of an area network, and devices within management of the area network.

A DIS (discovery) CSF serves to search for information and resources corresponding to a right (including permission in M2M service subscription) permitted within a given range and subject and a request from the originator within a given range. The originator may be an application or another CSE. The range of the search may be one CSE or a plurality of CSEs. A discovery result returns to the originator.

Group management (GMG) handles a group associated with the request. The request is transmitted to manage the group and membership of the group and also serves as a bulk operation supported by the group. When a member is added to or deleted from the group, it may be needed to identify whether the member accords with the purpose of the group. The bulk operation includes read, write, subscribe, inform, and device management. Requests and subscriptions are performed through the group, and the group serves to combine the requests and notifications. Members of the group play the same role for a right to access resources. In this case, an access control is performed by the group. When the underlying network provides a broadcasting function and a multicasting function, the GMG CSF should use such functions.

A LOC (Location) CSF allows an M2M AE to acquire geographical location information of an M2M node (for example, ASN or MN) for a location-based service. A request for the location information may be made from M2M AEs existing within the same or different M2M nodes.

A network service exposure (NSE) CSF manages communication with the underlying network to access a network service function through a Mcn reference point through an available or supportable scheme for a service request from an M2M system instead of an M2M application. The NSE CSF conceals another CSF and an AF from a particular technology and mechanism supported by the underlying network. Network service functions provided from the underlying network include device triggering, small data transmission, location notification, policy rule settings, location inquiry, IMS service, and device management, but are not limited thereto. The functions do not include a general transmission service.

Registration (REG) serves to handle registration of an application or another CSE in the CSE, and allows an entity which desires to use a service provided by the CSE to be registered. The REG CSF handles registration of device characteristics/attributes as well as registration of the device in the CSE.

SEC (Security) provides a data handling function requiring attention (sensitive), a security operation function, a security combination setting function, an authorization and access control function, and an identification protection function. The sensitive data handling function provided by the SEC CSF provides a function of protecting a local credential that is required to be secured in a storage and control process. The sensitive data handling function also uses a security algorithm. The function supports a security environment in which various encryption schemes are separated. The security operation function provides the following functions. First, the security operation function provides a function of generating and operating a security environment dedicated to be supported by the sensitive data handling function. Further, the security operation function supports post provisioning of a root credential protected in the security environment, and also supports provisioning and operation of subscription related to an M2M service and an M2M application service. The security combination setting function enables confidentiality, integrity, authentication, and authorization by setting a security combination between M2M nodes. The authorization and access control function controls a service and data access to an authorized entity according to a provisioned security policy and an assigned rule. A unique identifier of the entity may be used for the authorization, and the identification protection function may provide anonymity to function as a temporary identifier to be not linked with actual identification information combined with the entity or user.

Service charging and accounting (SCA) provides a charging function of a service layer. The SCA supports different charging models including online charging and offline charging. The SCA CSF guarantees an event to be charged, stores information, and generates charging records and charging information. The SCA CSF may interact with a charging system of the underlying network. However, the SCA CSF has responsibility for generating and recording charging information of a final service level. The SCA CSF of an underlying node or a service layer charging server has responsibility for handling charging information for the charging.

Service session management (SSM) CSF manages an M2M service session corresponding to an end-to-end service layer connection. The SSM CSF manages an M2M service session between M2M applications, between an M2M application and a CSE, or between CSEs. The management of the M2M service session includes management of a session state, session authentication and establishment, a connection of an underlying network related to the session and service management, control of session extension of a CSE corresponding to a multi-hop of the CSE, exchange of information between session ends, and end of the session. Within the given M2M service session, the SSM CSF uses CMDH CSF within a local CSE for message transmission/reception from a next hop CSE or an application. The SSM CSF uses an SEC CSF to manage a session related to a security credential and authentication of a session participant. The SSM CSF generates a charging event specified for a session and communicates with SCA CSF within the local CSE.

Subscription and notification (SUB) provides a notification to maintain subscription and tracks a change in resources (for example, deletion of resources). The subscription of resources is started by the M2M AE or the CSE and an access right thereof is granted by the hosting CSE. If the subscribed resources are changed during the activated subscription, the hosting CSE transmits a notification to an address at which a resource subscriber desires to receive the notification.

FIG. 4 and the description thereof are embodiments for implementing the common service entity, and the disclosure is not limited thereto.

Meanwhile, identifiers which can be applied to the embodiments are described below. M2M identifiers include an M2M service provider identifier (M2M-SP-ID), an application instance identifier (App-Inst-ID), an application identifier (App-ID), a CSE identifier (CSE-ID), an M2M node identifier/device identifier (M2M-Node-ID), an M2M service subscription identifier (M2M-Sub-ID), and a request identifier (M2M-Request-ID).

OneM2M presents overall system requirements, management requirements, data model and semantics requirements, security requirements, charging requirements, and operational requirements as requirements to be met to implement the system.

In the specification, the description is made on the basis of an M2M system technology, particularly, a oneM2M service platform technology. However, the description is not limited to the M2M service platform technology, and can be applied to all systems and structures for providing device-to-device communication, that is, M2M, and a communication operation performed in the systems.

The originator or the transmitter in the specification may be an M2M device that transmits a message, and the receiver or the hosting CSE may be an M2M device that receives a message. However, the receiver may also transmit a response message, and the originator may also receive a response message. Accordingly, an M2M device that initially transmits a request message in a specific procedure is described as the originator or the transmitter, and an M2M device that receives a transmitted request message is described as the receiver or the hosting CSE. Of course, both the originator and the receiver may transmit and receive message as described above.

Further, an M2M device in the specification is described to have a name indicating various nodes including the AE, the CSE, and the NSE, and for convenience of understanding, the description is made on the basis of the hosting CSE but is not limited thereto. That is, the M2M device is one element device included in the M2M system and includes various nodes, devices, and entities that receive a request message, process the request message, and transmit a response message.

In the M2M system, each M2M device included in the M2M device and an application that provides a program to a user on the basis of information of the corresponding M2M device exchange information required for each other. For example, the M2M device may perform creating, retrieving, deleting, updating, and notifying operations for required information, and another M2M device and application may make a request for a corresponding operation.

However, the M2M system may be configured by a plurality of M2M devices, and individual M2M devices may be generated and operated by different manufacturers or operators. Further, an application using M2M information may be configured on the basis of various platforms. Accordingly, different data management policies (data types or encoding schemes) may be applied to M2M devices or an M2M device and an application.

As described above, if different data management policies are applied, rapidly and accurately decoding, acquiring and using data of M2M devices using different data management policies may have a problem. For example, M2M devices performing different encoding types cannot identify the type in which exchanged information is encoded. Accordingly, if the decoding operation for the corresponding information is performed according to the encoding type applied to the M2M device receiving the information, the M2M device cannot acquire information since the information is not decoded.

Hereinafter, a situation having such a problem is described on the basis of a data transmission/reception operation between M2M devices. However, as described above, the disclosure can be equally applied to the case in which an application uses information of the M2M device.

Meanwhile, time-series resources in the specification are only one example of data managed by the M2M device, but the disclosure can be equally applied to various resources. That is, time-series resources refer to resources for data collected and stored in time series such as a use amount of a water supply or a use amount of electricity, and the disclosure can be equally applied to all resources stored and managed by the M2M device as well as the time-series resources. Hereinafter, <timeSeries> resources are described as time-series resources and <timeSeriesInstance> resources are described as subsidiary resources of the time-series resources as necessary.

Meanwhile, the M2M device may include subsidiary resources and attribute information for each resource, and the subsidiary resources and the attribute information may be stored and managed separately according to the purpose thereof.

Figure 5:
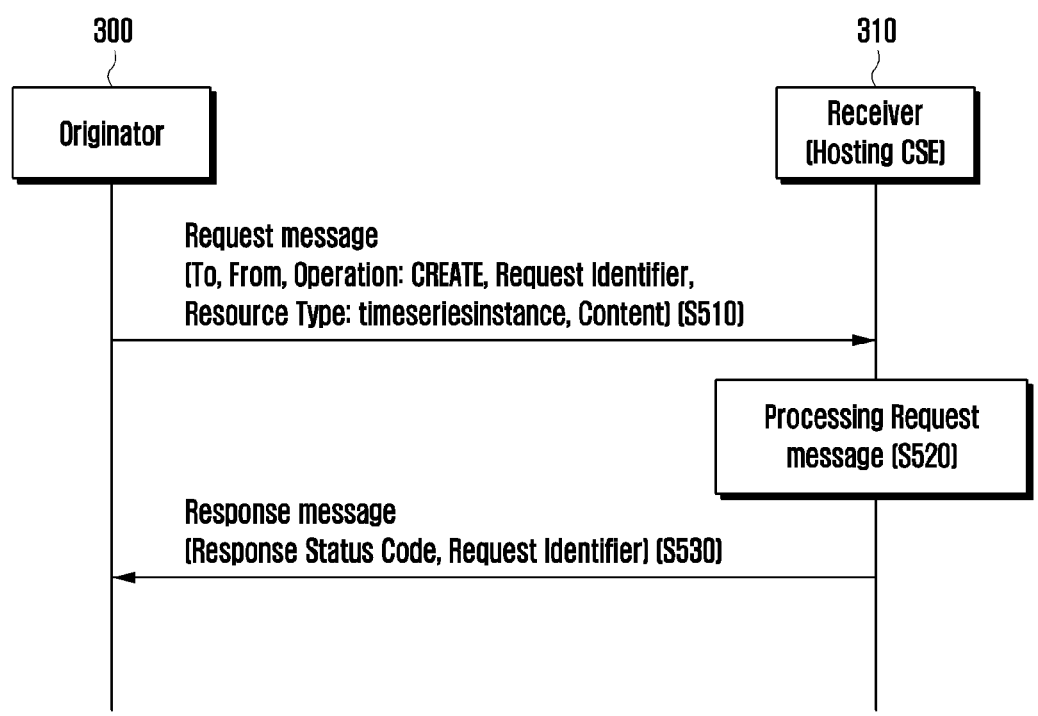
FIG. 5 illustrates a procedure of processing a request message for creating <timeSeriesInstance> resources according to an embodiment.

FIG. 5 illustrates a procedure of processing a request message for creating <timeSeriesInstance> resources according to an embodiment.

Referring to FIG. 5, the originator 300 may transmit a request message making a request for creating time-series instance resources to the receiver 310 in S310. For example, the request message may insert a necessary parameter and a selective parameter into the request message. For example, the request message necessarily includes a transmitting side parameter, a receiving side parameter, an operation parameter, and a request identification parameter. The request message may selectively include a response type parameter.

Since the request message of step S510 is a request message that makes a request for creating time-series instance resources, the operation parameter is configured as a value indicating "create" and the resource type is configured as a value indicating "time-series instance resources". Meanwhile, the content parameter includes information on content to be created.

The receiver 310 receives the request message, identifies each parameter of the corresponding request message, and performs an indicated operation, so as to process the request message in S520. For example, the receiver 310 creates time-series instance resources subsidiary resources of the time-series resources and stores content information included in the request message in the corresponding time-series instance resources.

Thereafter, the receiver 310 transmits a response message to the originator 300 according to the processing result of step S520 in S530. For example, the response message may include response state code information and request identification parameter information. For example, the request identification parameter information is configured as a value which is the same as the request identification parameter information of step S510 and indicates a request message to which the corresponding response message is a response. In another example, the response state code may be configured as a value indicating the type of success, failure, or other and indicates whether processing of the corresponding request message is successful or has failed, or a preset type operation is generated.

Through the operation, the originator 300 may make a request for creating specific resources to the receiver 310 and make a request for updating, retrieving, or deleting specific resources through the same or similar operation. Alternatively, the receiver 310 may notify of specific resources as necessary.

FIG. 6 illustrates a message code and a response message code based on an operation of a request message according to an embodiment.

Referring to FIG. 6, the creation request message of FIG. 5 may be transmitted in various methods.

For example, the request message of FIG. 5 may be transmitted while including a value of each parameter as indicated by reference numeral 600. "to" indicates a receiving side parameter that is a target receiver of the corresponding request message. "from" indicates a transmitting side parameter that is an originator who transmits the request message. "op" indicates an operation parameter that is configured to indicate one of create, retrieve, update, delete, and notify. In the embodiment, the operation parameter is configured as 1 indicating "create". "rgi" indicates a request identification parameter that may be configured as a specific value. "pc" indicates content and includes information on a vehicle, speed, weather, and state in the embodiment.

The request message may be transmitted in JavaScript Object Notation (JSON) format, and reference numeral 600 indicates a document format in JSON. Further, reference numeral 600 implicitly indicates an encoding type and that transmitted data is not encrypted, that is, there is no content security.

The receiver receiving the request message indicated by reference numeral 600 performs an operation of processing the corresponding request message and transmits a response message in a format as indicated by reference numeral 605. For example, "rsc" indicates a response state code parameter and may be configured as a value indicating processing success 2001, and the request identification parameter is configured as the same value as "rqi" as indicated by reference numeral 600. The originator receives a response message indicated by reference number 605 and recognizes that resources are successfully created according to the request message indicated by reference numeral 600.

Meanwhile, reference numerals 650 and 655 indicate JSON-type document formats of the request message and the response message when the operation parameter is configured as "retrieve".

In the case of reference numeral 650, the operation parameter may be configured as 2 indicating "retrieve", which makes a request for a retrieving operation of specific resources, and may not include content as indicated by reference numeral 600.

Upon receiving the request message indicated by reference numeral 650, the receiver configures a response message as indicated by reference numeral 655 to include information on the corresponding requested resources in content and transmits the response message.

In the case of reference numerals 650 and 655, each message may be transmitted in the JavaScript Object Notation (JSON) type and indicate JSON type document formats. Further, reference numerals 650 and 655 implicitly indicate an encoding type and that transmitted data is not encrypted, that is, there is no content security.

However, methods of expressing content may very vary depending on a media type, an encoding type, and a content security type of data.

FIG. 7 illustrates a content processing method variously expressed according to a data processing type. Referring to FIG. 7, even content that is the same as the request message and the response message of FIG. 6 may be expressed in various cases as shown in [Table 7].

For example, the media type may include there types such as XML, JSON, and concise binary object representation (CBOR), and the encoding type may include various types such as Plan and Base64. Further, although not illustrated in FIG. 7, the content security type may be variously configured.

Accordingly, if the number of media types is 3, the number of encoding types is 3, and the number of content security types is 7, the number of methods of expressing the same content data may be 63. As described above, various types of expression methods in addition to the methods in FIG. 7 may exist.

For specific resources, media type information, encoding type information, and content type security information may be defined.

For example, the media type information may be defined in RFC6838 and managed by a specific management entity (for example, https://www.iana.org/assignments/media-types/media-types.xhtml).

In another example, the encoding type information may be divided into a type indicating no encoding, a Base64 encoding type for string data such as a character string, and a Base64 encoding type for binary data, as shown in [Table 1] below.

TABLE 1

| Encoding type indication value | Encoding type |
|---|---|
| 0 | Plain - no transfer encoding is applied |
| 1 | base64 encoding is applied on string data |
| 2 | base64 encoding is applied on binary data |

In another example, the content security type information may be divided as shown in [Table 2] below.

TABLE 2

| Content security type indication value | Content security type |
|---|---|
| 0 | ESData has not been applied to the content data. |
| 1 | ESData using JWE and/or JWS with Compact Serialization has been applied to the content data with no subsequent transfer encoding. |
| 2 | ESData using JWE and/or JWS with JSON Serialization has been applied to the content data with no subsequent transfer encoding. |
| 3 | ESData using JWE and/or JWS with JSON Serialization has been applied to the content data and subsequent base64 encoding (see [9]) has been applied. |
| 4 | ESData using XML encryption and/or XML-Signature has been applied to the content data has been applied with no subsequent transfer encoding. |
| 5 | ESData using XML encryption and/or XML-Signature has been applied to the content data and subsequent base64 encoding (see [9]) has been applied. |

Each type described above is only an example, and various other types may be applied according to a configuration. As described above, since various media types, encoding types, and content security types may be applied, if an M2M device or an application accesses specific content, the M2M device cannot recognize in advance the type and thus smooth information exchange cannot be made.

That is, the M2M device receiving the corresponding request message or response message cannot identify which media type, encoding type, or content security type is applied to the received content information, and should perform decoding by combining all of the number of cases (a maximum of 63) for respective types defined in the protocol standard.

Figure 8:
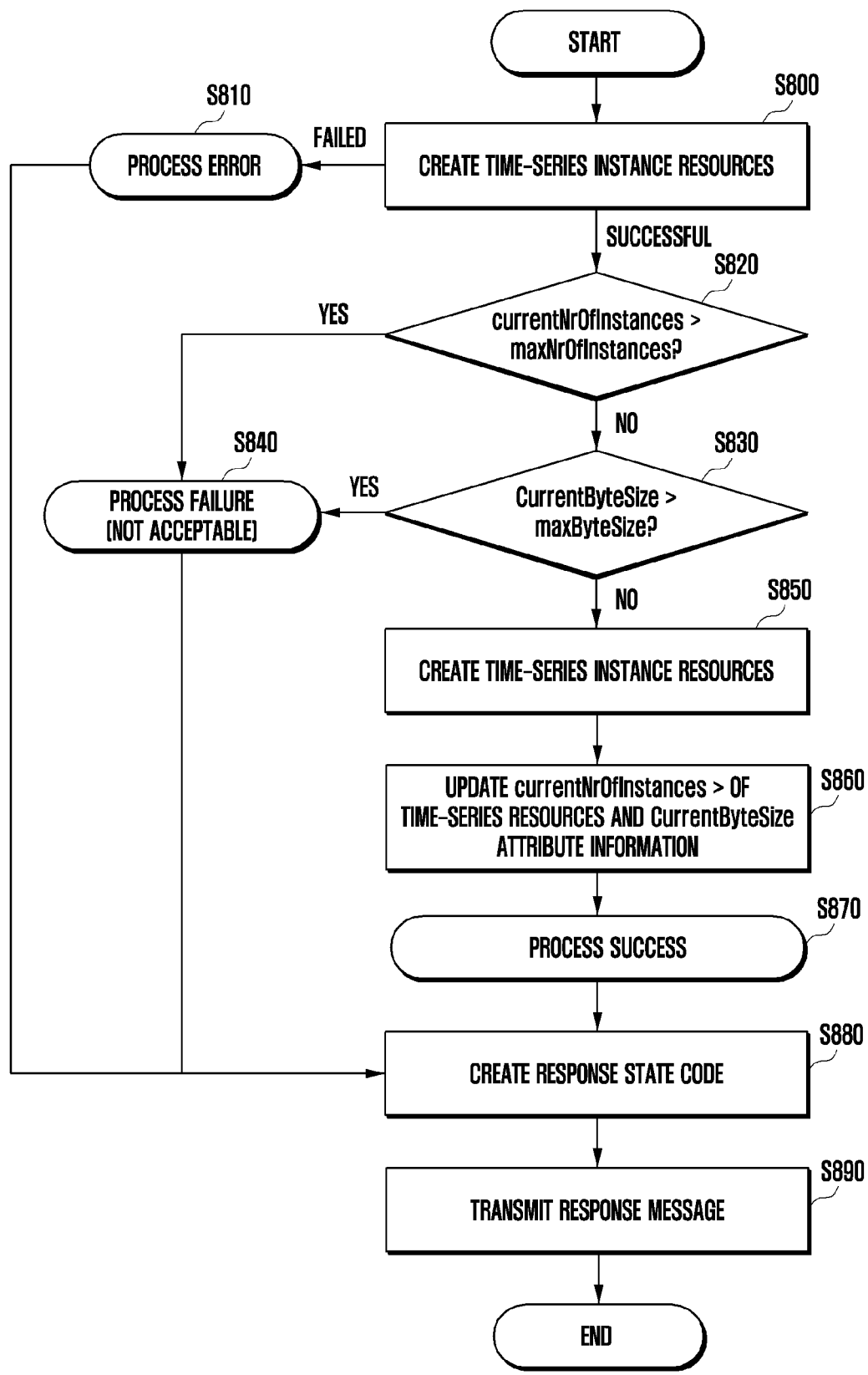
FIG. 8 illustrates an operation for processing target resources according to the conventional request message.

FIG. 8 illustrates an operation for processing target resources according to the conventional request message.

Referring to FIG. 8, an M2M device receiving a request message may create and process target resources by applying a preset media type, encoding type, and content security type to the corresponding device. That is, the target resources are processed regardless of an originator transmitting the request message or an application having a possibility to use the corresponding target resources.

For example, upon receiving the request message that makes a request for creating time-series instance resources (<timeSeriesInstance> resource), the M2M device identifies a request parameter of the corresponding request message in S800. If identification of the request parameter has failed, the request message cannot be identified, so that the M2M device processes an error in S810. In this case, the M2M device creates a response state code mapped to and configured in an error state in S880 and transmits a response message including the response state code in S890.

Meanwhile, if identification of the request parameter is successful, the M2M device compares a maximum instance number included in lower attribute information of time-series resources with a currently stored instance number in S820. maxNrOfInstances are attribute information indicating the maximum instance number of time-series resources, and currentNrOfInstances are attribute information indicating the current instance number. The current instance number may be configured to include or exclude instance number indicated by the request message.

If the current instance number is not larger than the maximum instance number, the M2M device compares a maximum byte size included in lower attribute information of time-series resources with a current byte size in S830. CurrentByteSize is attribute information indicating the byte size of current time-series resources, and maxByteSize is attribute information indicating the maximum byte size configured in time-series resources.

If the current byte is not larger than the maximum byte size, the M2M device creates time-series instance resource indicated by the request message in S850. The time-series instance resources may be created as lower subsidiary resources of the time-series resources.

Unlike this, if the current instance number of the current byte size is larger than the maximum value in one of steps S820 and S830, the M2M device processes failure indicating that the corresponding request message cannot be processed in S840. In this case, the M2M device creates a response state code preset according to the corresponding failure processing type in S880 and transmits a response message including the response state code in S890.

Since the time-series instance resources have been additionally created, after step S850, the M2M device reflects the created instance resources to update values of currentNrOfInstances attribute information and CurrentByteSize attribute information among the lower attribute information of the time-series resources in S860

Thereafter, the M2M device processes success of the request message in S870, creates a response state code mapped to and configured in success processing in S880, and transmits a response message including the same in S890.

Through such a series of operations, the M2M device processes a request message. However, in the prior art, a policy configured in the M2M device was applied without separate identification of the mediate type, the encoding type, and the content security type in S850. That is, in the prior art, one of the cases of FIG. 7 is applied and processed when target resources are implicitly created.

For example, if the M2M device applies the format of CASE B of FIG. 7 to create target resources, another M2M device (AE or CSE) uses resource name attribute information and label attribute information, which are selective parameter resources, to search for and use target resources. This is because the M2M device cannot search for a vehicle through content encoded by Base64. If the M2M device creating the target resources creates label attribute information corresponding to "vehicle", another M2M device may search for target resources on the basis of the corresponding label attribute information. However, a new originator who makes a request for retrieving target resources cannot understand or analyze "ew0KCSJ0aGluZyI6ICJjYXIiLA0KCSJzdG F0dXMiOiAiZHJpdmUiLA0KCSJzcGV1ZCI6ICI xMDAiDQp9", which is content of the target resources or attribute information of the content. This is because the type in which the content of the target resources or the attribute information is encoded cannot be identified.

A similar problem may occur in the case in which a request for retrieving target resources is made.

Figure 9:
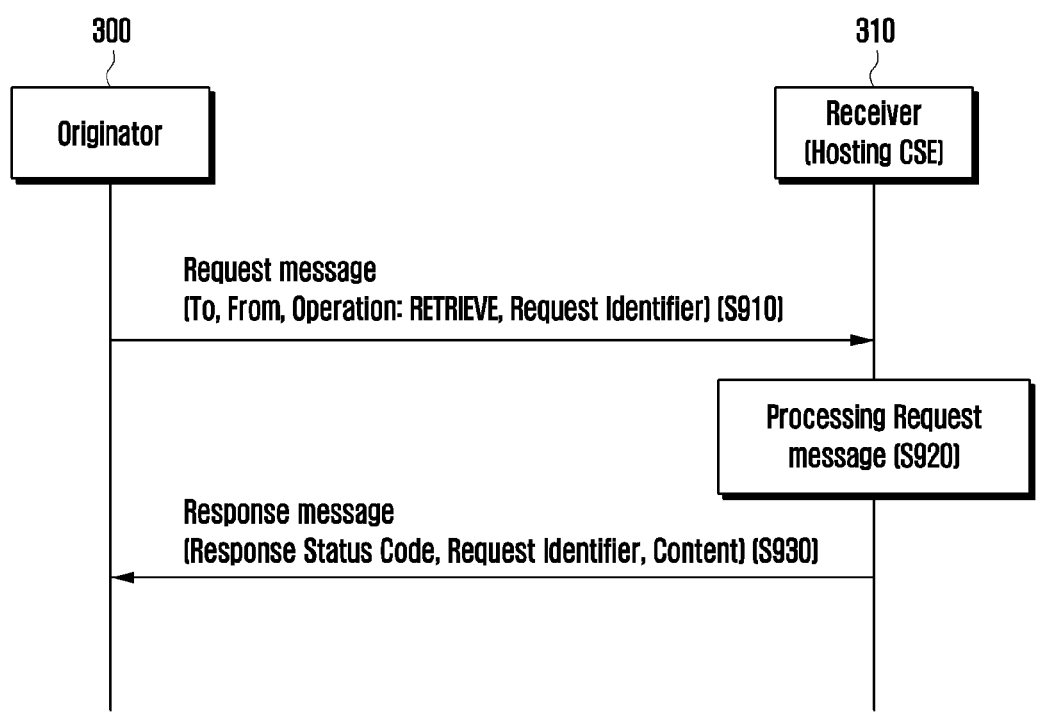
FIG. 9 illustrates an operation for processing a request message that makes a request for retrieving target resources according to an embodiment.

FIG. 9 illustrates an operation for processing a request message that makes a request for retrieving target resources according to an embodiment.

Referring to FIG. 9, the originator 300 may transmit a request message that makes a request for a retrieving operation of specific resources in S910. For example, the request message may necessarily include the above-described operation parameter, receiving side parameter, transmitting side parameter, and request identification parameter. The operation parameter is configured as a value indicating "retrieve".

Upon receiving the request message, the receiver 310 performs a retrieving operation through the requested operation parameter in S920.

Thereafter, the receiver 310 transmits a response message including content of the retrieved target resources to the originator 300 in S1030. The request identification parameter of the response message may be configured as the same value as the request identification parameter of the request message. Further, if the retrieving request is successfully processed, the receiver 310 may configure a value of a response state code (for example, 2000) indicating the success and transmit a response message including the response state code.

Codes of the request message and the response message of FIG. 9 are described with reference to FIGS. 10 and 11.

FIG. 10 illustrates an example of a code of the request message for retrieving <timeSeriesInstance> resources according to an embodiment.

Referring to FIG. 10, the request message includes an operation parameter configured as 2, which makes a request for retrieving target resources, a transmitting side parameter, and a receiving side parameter. Further, a request identification parameter is configured as a specific value.

FIG. 11 illustrates an example of a code of the response message in response to the request message of FIG. 10 according to an embodiment.

Referring to FIG. 11, the response message indicates that the corresponding request message has been successfully processed through a response state code. Further, the request identification parameter is configured as the same value as the value of the request message. Content information includes information on target resources to be retrieved. Particularly, "con" of the content information may include a code for the corresponding resources in a CASE B format of FIG. 7 in which the receiver stores the corresponding target resources as described above.

Figure 12:
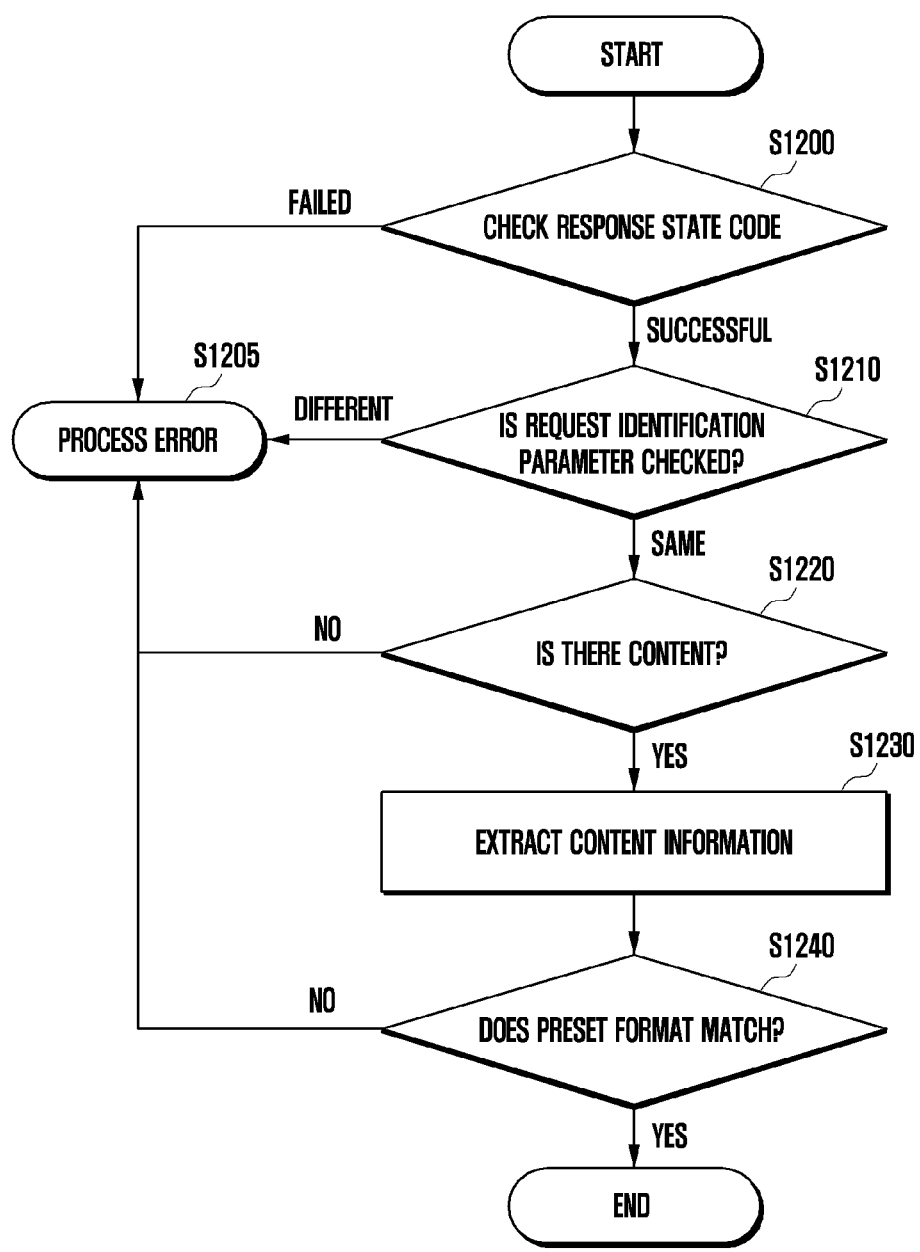
FIG. 12 illustrates an operation for extracting information through the response message of FIG. 11.

FIG. 12 illustrates an operation for extracting information through the response message of FIG. 11.

Referring to FIG. 12, the request message originator receiving the response message code of FIG. 11 checks the response state code of the received response message in S1200. If the response state code is configured as a value indicating successful processing of the request message, the originator checks whether the request identification parameter is the same as the request identification parameter of the request message in S1210. Sequences of steps S1200 and S1210 may be changed.

If it is determined that the request identification parameters are the same as each other on the basis of the determination result of step S1210, the originator determines whether there is content in S1220. If it is determined that there is content, the originator extracts content information from the corresponding content parameter in S1230. However, the content information is included according to a data management type of the receiver transmitting the response message as illustrated in FIG. 11, and thus the originator determines whether the extracted content information matches a preset originator format in S1240.

If the response state code indicates failure, the request identification parameters are not the same as each other, or there is no content in each of steps S1200, S1210, and S1220, the originator performs an error processing operation in S1205.

Meanwhile, the originator applies the data management type of the originator to decode the content information. If the receiver and the originator use different data management types, the decoding may fail. Alternatively, the originator may sequentially attempt the decoding on all data management types.

However, although there is content information and the content information is completely extracted, the originator may fail in decoding since the originator does not know the format, or sequentially applying the number of all cases to perform decoding may act as fatal a problem in an information transferring function. That is, information may not be properly exchanged or unnecessary resources may be used to acquire exchanged information.

The disclosure made to solve the problem makes smooth exchange of information by adding information on a data type to lower attribute information of target resources.

Figure 13:
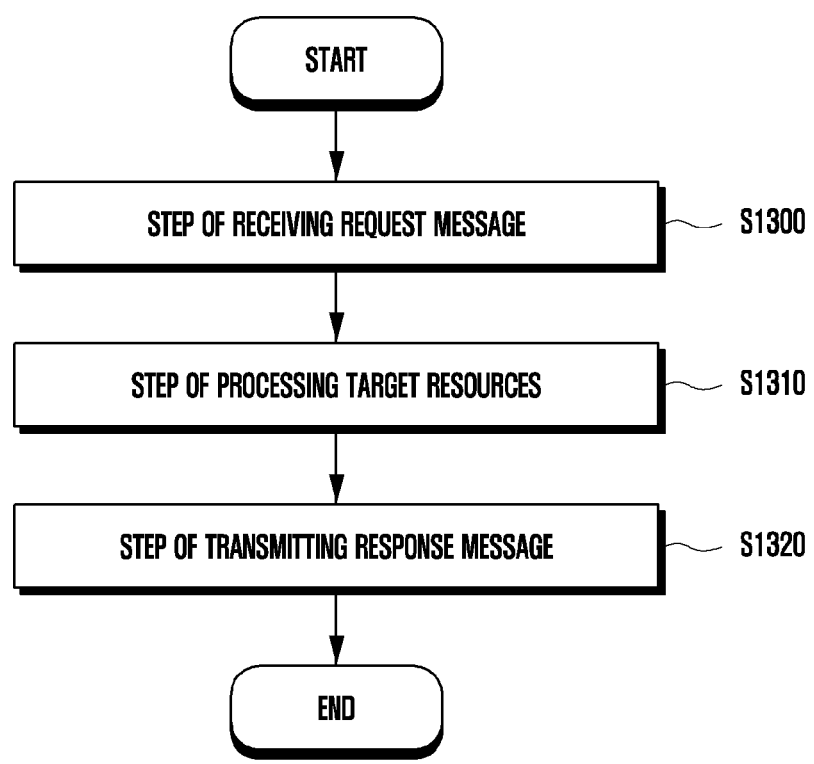
FIG. 13 illustrates the operation of the M2M device according to an embodiment.

FIG. 13 illustrates the operation of an M2M device according to an embodiment.

Referring to FIG. 13, through a method of processing a message, a machine-to-machine (M2M) device performs a step of receiving a request message including an operation parameter, a receiving side parameter, a transmitting side parameter, and a request identification parameter from another M2M device in S1300.

For example, the request message includes necessary parameters such as a transmitting side parameter indicating an originator, a receiving side parameter indicating a receiver, an operation parameter indicating an operation type, and a request identification parameter for identifying a request and a response. Further, the request message may further selectively include a content parameter according to each operation parameter. For example, a request message indicating operations of create or update may include a content parameter of target resources to be created or content to be updated.

Further, the M2M device performs a step of processing target resources including attribute information indicating resource information according to an operation indicated by the operation parameter in S1310. For example, upon receiving a request message, the M2M device processes target resources on the basis of the operation parameter.

For example, the attribute information may include at least one piece of mediate type information for target resources, encoding type information, and content type security type information. That is, the attribute information may include at least one piece of the mediate type information, the encoding type information, and the content security type information applied to the target resources.

Further, the target resources may be time-series instance resources that are time-series resources or lower subsidiary resources of time-series resources. That is, the target resources may be resources stored and managed by the M2M device or lower subsidiary resources of the corresponding resources.

For example, the attribute information may be Contentinfo attribute information that is lower attribute information of the target resources, and Contentinfo attribute information may necessary include mediate type information and encoding type information applied to the target resources and selectively include content security type information.

Meanwhile, the M2M device may use attribute information to process the target resources according to the operation parameter.

For example, if the operation parameter indicates "create", the M2M device may insert at least one piece of the mediate type information, the encoding type information, and the content security type information applied to the target resources into Contentinfo attribute information, and configure Contentinfo attribute information as lower attribute information of the target resources, so as to create the target resources.

In another example, if the operation parameter indicates "retrieve", the M2M device may specify resources, to be retrieved, requested by the originator and specify Contentinfo attribute information, which is attribute information applied to the corresponding target resources, as information to be included in the response message.

As described above, by managing, as the attribute information, the target resources and at least one piece of the media type information, the encoding type information, and the content security type information for the corresponding target resources, the M2M device or an application may clearly identify type information of the corresponding target resources.

Further, the M2M device performs a step of transmitting a response message including response information in response to the request message in S1320. For example, if the operation parameter indicates "retrieve" or "notify", the M2M device transmits a response message including target resources and attribute information. Meanwhile, the response message may include a response state code, and if the operation parameter indicates "create" or "delete", the response state code may be configured as a value indicating successful or failed processing of the corresponding operation.

The response message includes a request identification parameter configured as the same value as the request identification parameter included in the request message.

In addition, if the response mode of the request message is indicated as flex blocking, the response message may include response state codes individually mapped to response modes processed by the M2M device. The response mode is to identify an operation for processing the corresponding request message, and is divided into blocking, synchronous non-blocking, asynchronous non-blocking, and flex blocking. The flex blocking mode is to determine the response mode by the receiver, in which the originator cannot know the response mode selected by the receiver. Accordingly, by configuring a value indicating successful processing of the response state code as a value according to each response mode, the originator may recognize which response mode is used to perform an operation of processing a response to the request message by receiving the response message.

Hereinafter, configurations of attribute information and subsidiary resources in the case in which target resources are time-series resources and the case in which the target resources are time-series instance resources are described.

Figure 14:
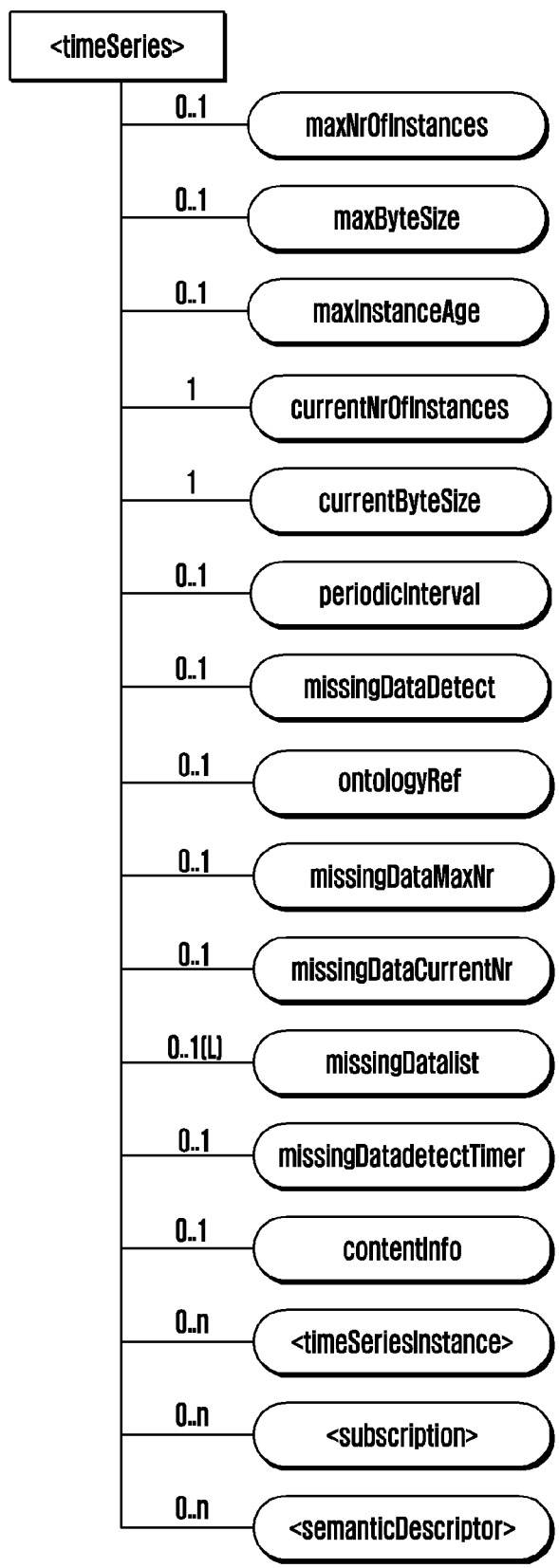
FIG. 14 illustrates an example of a structure of time-series resources including ContentInfo attribute resources according to an embodiment.

FIG. 14 illustrates an example of a structure of time-series resources including ContentInfo attribute information according to an embodiment.

Referring to FIG. 14, time-series resources (<timeseries> resource) may include various pieces of attribute information containing contentInfo attribute information and subsidiary resources of time-series instance resources.

For example, <timeseries> resources including contentInfo attribute information may be configured as shown in [Table 3].

TABLE 3

| Attributes of <timeSeries> | Multiplicity | RW/ RO/ WO | Description | <timeSeriesAnnc> Attributes |
|---|---|---|---|---|
| resourceType | 1 | RO | See clause 9.6.1.3. | NA |
| resourceID | 1 | RO | See clause 9.6.1.3. | NA |
| resourceName | 1 | WO | See clause 9.6.1.3. | NA |
| parentID | 1 | RO | See clause 9.6.1.3. | NA |
| expirationTime | 1 | RW | See clause 9.6.1.3 | MA |
| accessControlPolicyIDs | 0 . . . 1 (L) | RW | See clause 9.6.1.3. If no accessControlPolicyIDs value is configured, the accessControlPolicyIDs of the parent resource shall be applied for privilege checking. | MA |
| labels | 0 . . . 1 (L) | RW | See clause 9.6.1.3. | MA |
| creationTime | 1 | RO | See clause 9.6.1.3. | NA |
| lastModifiedTime | 1 | RO | See clause 9.6.1.3. | NA |
| stateTag | 1 | RO | See clause 9.6.1.3. | OA |
| announceTo | 0 . . . 1 (L) | RW | See clause 9.6.1.3. | NA |
| announcedAttribute | 0 . . . 1 (L) | RW | See clause 9.6.1.3. | NA |
| dynamicAuthorizationConsultationIDs | 0 . . . 1 (L) | RW | See clause 9.6.1.3. | OA |
| creator | 1 | RO | See clause 9.6.1.3. | NA |
| maxNrOfInstances | 0 . . . 1 | RW | Maximum number of direct child <timeSeriesInstance> resources in the <timeSeries> resource. | OA |

TABLE 3-continued

| Attributes of <timeSeries> | Multiplicity | RW/RO/WO | Description | <timeSeriesAnnc> Attributes |
|---|---|---|---|---|
| maxByteSize | 0 . . . 1 | RW | Maximum size in bytes of data that is allocated for the <timeSeriesInstance> resource for all direct child<timeSeriesInstance> resources. | OA |
| maxInstanceAge | 0 . . . 1 | RW | Maximum age of a direct child <timeSeriesInstance> resource in the <timeSeries> resource. The value is expressed in seconds. | OA |
| currentNrOfnstances | 1 | RO | Current number of direct child <timeSeriesInstance> resource in the <timeSeries> resource. It is limited by the maxNrOfInstances. The currentNrOfInstances attribute of the <timeSeries> resource shall be updated on successful creation or deletion of direct child <timeSeriesInstance> resource of <timeSeries> resource. | OA |
| currentByteSize | 1 | RO | Current size in bytes of data stored in all direct child <timeSeriesInstance> resources of a <timeSeries> resource. It is limited by the maxByteSize. The currentByteSize attribute of the <timeSeries> resource shall be updated on successful creation or deletion of direct child <timeSeriesInstance> resource of <timeSeries> resource. | OA |
| periodicInterval | 0 . . . 1 | WO | If the Time Sereis Data is periodic, this attribute shall contain the expected amount of time between two instances of Time Series Data. | OA |
| missingDataDetect | 0 . . . 1 | WO | Indicates whether the Receiver shall detect the missing Time Series Data if it is periodic. | NA |
| ontologyRef | 0 . . . 1 | RW | A reference (URI) of the ontology used to represent the information that is stored in the child <timeSeriesInstance> resources of the present <timeSeriesData> resource(see note). | OA |
| missingDataMaxNr | 0 . . . 1 | RW | Maximum number of entries in the missingDataList if the periodicInterval is set and the missingDataDetect is TRUE. | OA |
| missingDataCurrentNr | 0 . . . 1 | RO | Current number of the missing Time Series Data in the missingDataList. | OA |
| missingDataList | 0 . . . 1(L) | RO | The list of the dataGenerationTime value representing the missing Time Series Data in descending order by time if the periodicInterval is set and the missingDataDetect is TRUE. | OA |

TABLE 3-continued

| Attributes of <timeSeries> | Multiplicity | RW/RO/WO | Description | <timeSeriesAnnc> Attributes |
|---|---|---|---|---|
| missingDataDetectTimer | 0 . . . 1 | RW | The missingDataDetectTimer after which a missing Time Series Data shall be considered lost by the hosting CSE. Note that the setting of this value may not apply in certain transports such as TCP, and as such the hosting CSE may reject proposed values or suggest different values. | OA |
| contentInfo | 0 . . . 1 | WO | This attribute contains information to understand the contents of the content attribute of <timeSeriesInstance>. It shall be composed of two mandatory components consisting of an Internet Media Type (as defined in the IETF RFC 6838) and an encoding type. In addition, an optional content security component may also be included. The format of this attribute is defined in oneM2M TS-0004 [3]. If not present, the default shall be a media type of XML, an encoding type of plain text and no optional content security. | OA |

NOTE:
The access to this URI is out of scope of oneM2M.

Figure 15:
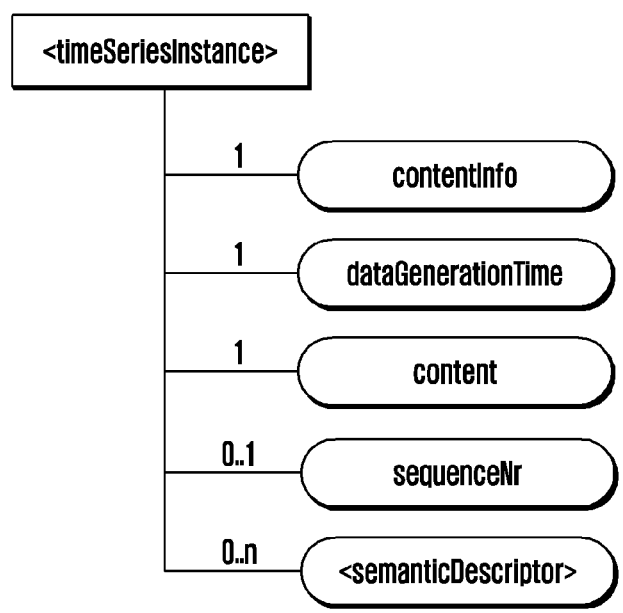
FIG. 15 illustrates an example of a structure of time-series instance resources including ContentInfo attribute resources according to an embodiment.

In [Table 3] above, "See clause 9.6.1.3." is used for some parts for convenience of description, and refers to the corresponding clause of document OneM2M TS-0001 for the corresponding parts. FIG. 15 illustrates an example of a structure time-series instance resources including ContentInfo attribute information according to an embodiment.

Referring to FIG. 15, time-series instance resources (<timeSeriesInstance> resource) may also include contentInfo attribute information including information indicating a media type, an encoding type, and a content security type.

For example, <timeSeriesInstance> resources indicate a data entity of <timeSeries> resources. If <timeSeriesInstance> resources are created once, the <timeSeriesInstance> resources cannot be modified, and an application entity (AE) should explicitly delete the <timeSeriesInstance> resources and may delete the same from a platform according to a policy. If there is a policy for reserving <timeSeriesInstance> resources in the platform, the corresponding policy is expressed as maxByteSize, maxNrOfInstances, or maxInstanceAge of <timeSeries> resources, or a combination of the attribute information. If a plurality of polices are conducted, the most strict policy is applied. <timeSeriesInstance> resources inherits the same access control policy as higher <timeSeries> resources, and has a difference therefrom in that the <timeSeriesInstance> resources have no accessControlPolicyIDs attribute information.

Meanwhile, <timeSeriesInstance> resources may include predetermined lower subsidiary resources of [Table 4].

TABLE 4

| Child Resources of <timeSeriesInstance> | Child Resource Type | Multiplicity | Description | <timeSeriesInstanceAnnc> Child Resource Types |
|---|---|---|---|---|
| [variable] | <semanticDescriptor> | 0 . . . n | See clause 9.6.30 | <semanticDescriptor>, <semanticDescriptorAnnc> |

In [Table 4] above, "See clause 9.6.30." is used for some parts for convenience of description, and refer to the corresponding clause of document OneM2M TS-0001 for the corresponding parts. Further, <timeSeriesInstance> resources include attribute information specified in [Table 5].

TABLE 5

| Attributes of <timeSeriesInstance> | Multiplicity | RW/ RO/ WO | Description | <timeSeriesInstanceAnnc> Attributes |
|---|---|---|---|---|
| resourceType | 1 | RO | See clause 9.6.1.3. | NA |
| resourceID | 1 | RO | See clause 9.6.1.3. | NA |
| resourceName | 1 | WO | See clause 9.6.1.3. | NA |
| parentID | 1 | RO | See clause 9.6.1.3. | NA |
| labels | 0 . . . 1 (L) | WO | See clause 9.6.1.3. | MA |
| creationTime | 1 | RO | See clause 9.6.1.3. | NA |
| expirationTime | 1 | WO | See clause 9.6.1.3. | NA |
| announceTo | 0 . . . 1 (L) | RW | See clause 9.6.1.3. | NA |
| announcedAttribute | 0 . . . 1 (L) | RW | See clause 9.6.1.3. | NA |
| lastModifiedTime | 1 | RO | See clause 9.6.1.3. | NA |
| contentInfo | 1 | WO | This attribute is an information to understand the contents of content attribute. It shall be composed by three elements of Internet Media Type (as defined in the IETF RFC 6838), encoding type and content security. The delimeter shall be used ':' character as defined in oneM2M TS-0004 [3]. | OA |
| dataGenerationTime | 1 | WO | This attribute contains the time when the data was generated by the AE/CSE. | OA |
| content | 1 | WO | This attribute contains the data generated by the AE/CSE. | OA |
| sequenceNr | 0 . . . 1 | WO | This attribute contains the data sequence number generated by the AE/CSE | OA |

Like in [Table 3], in [Table 5], "See clause 9.6.1.3." is used for some parts for convenience of description, and refers to the corresponding clause of document OneM2M TS-0001 for the corresponding parts. As described above, <timeSeriesInstance> resources may include contentInfo attribute information. The contentInfo attribute information may include information for understanding content of content attribute information. For example, the contentInfo attribute information may include three elements such as a media type, an encoding type, and content security type. Further, ":" is used as a delimeter for delimiting attribute information.

As described above, <timeSeries> resources may have <timeSeriesInstance> resources as subsidiary resources. <timeSeriesInstance> resources may separately include attribute information indicating a media type, but attribute information generated in <timeSeriesInstance> resources may have a different value of content attribute information according to a time at which the attribute information is generated. However, since items of the attribute information are the same, the case in which <timeSeries> Resources include contentInfo attribute information has an effect of reducing communication for transmitting <timeSeriesInstance> resources compared to the case in which <timeSeriesInstance> contentInfo attribute is used. Further, in an aspect of storage and management, an amount of data can be reduced, and if a large amount of <timeSeriesInstance> resource information is retrieved and extracted, a processing method can be simplified.

Accordingly, attribute information including the type information may be configured in <timeSeriesInstance> resources, and attribute information including the type information may be configured in <timeSeries> resources which are higher resources as necessary.

Meanwhile, attribute information indicating the media type, the encoding type, and the content security type may be configured as attribute information of content instance resources.

For example, in the prior art, when <contentInstance> resources for expressing general data are configured, contentInfo attribute information has no information on content security, so encrypted data could not be processed. That is, if content attribute information of <contentInstance> resources is encrypted, the receiver can understand the content only after identifying at least seven possibilities in order to accurately understand the content. Particularly, specialized data such medical data should be read only by the person concerned, so that encryption of the data is necessary during a storage or transmission step. Accordingly, it is very difficult to acquire information for developing an application service through encrypted general data.

Therefore, the disclosure may be applied to general data <contentInstance> resources and contentInfo attribute information including information on the media type, the encoding type, and the content security type may be configured in general data <contentInstance> resources. That is, contentInfo attribute information included in <contentInstance> resources may include three elements such as the media type, the encoding type, and the content security type. Further, ":" may be used as a delimeter for delimiting attribute information.

For example, <contentInstance> resources including contentInfo attribute information may include various pieces of attribute information as shown in [Table 6].

TABLE 6

| Attributes of <contentInstance> | Multiplicity | RW/ RO/ WO | Description | <contentInstanceAnnc> Attributes |
|---|---|---|---|---|
| resourceType | 1 | RO | See clause 9.6.1.3. | NA |
| resourceID | 1 | RO | See clause 9.6.1.3. | NA |
| resourceName | 1 | WO | See clause 9.6.1.3. | NA |
| parentID | 1 | RO | See clause 9.6.1.3. | NA |
| labels | 0 . . . 1 (L) | WO | See clause 9.6.1.3. | MA |
| expirationTime | 1 | WO | See clause 9.6.1.3. | NA |
| creationTime | 1 | RO | See clause 9.6.1.3. | NA |
| lastModifiedTime | 1 | RO | See clause 9.6.1.3. | NA |
| stateTag | 1 | RO | See clause 9.6.1.3. The stateTag attribute of the parent resource should be incremented first and copied into this stateTag attribute when a new instance is added to the parent resource. | OA |
| announceTo | 0 . . . 1 (L) | WO | See clause 9.6.1.3. | NA |
| announcedAttribute | 0 . . . 1 (L) | WO | See clause 9.6.1.3. | NA |
| dynamicAuthorization ConsultationIDs | 0 . . . 1 (L) | RW | See clause 9.6.1.3. | OA |
| creator | 0 . . . 1 | RO | See clause 9.6.1.3. | NA |
| contentInfo | 0 . . . 1 | WO | This attribute contains information to understand the contents of content attribute. It shall be composed of two mandatory components consisting of Internet Media Type (as defined in the IETF RFC 6838) and an encoding type. In addition, an optional content security component may also be included. The format of this attribute is defined in oneM2M TS-0004 [3]. If not present, the default shall be a media type of XML, an encoding type of plain text and no optional content security. | OA |
| contentSize | 1 | RO | Size in bytes of the content attribute. | OA |
| contentRef | 0 . . . 1 | RW | This attribute contains a list of name-value pairs. Each entry expresses and associative reference to a <contentInstance> resource. The name of the entry indicates the relationship and the value of the entry the indicates reference (URI) to the resource. | OA |
| ontologyRef | 0 . . . 1 | WO | A reference (URI) of the ontology used to represent the information that is stored in the contentInstances resources of the <container> resource. If this attribute is not present, the contentInstance resource inherits the ontologyRef from the parent <container> resource if present(see note). | OA |
| content | 1 | WO | Actual content of a contentInstance. This content may be opaque data for understandable with the help of the contentInfo. This may, for example, be an image taken by a security camera, or a temperature measurement taken by a temperature sensor. | OA |

NOTE:
Access to this URI is out of scope of oneM2M.

In [Table 6], "See clause 9.6.1.3." is used for some parts for convenience of description, and refers to the corresponding clause of document OneM2M TS-0001 for the corresponding parts.

As described above, when transmitting the response message including content, the M2M device also transmits attribute information including information on at least one of a media type, an encoding type, and a content security type of target resource content to be retrieved. Accordingly, the originator transmitting the request message does not fail in decoding through the response message or does not waste many resources in decoding.

Hereinafter, the operation of the originator receiving a response message including content when the disclosure is applied will be described with reference to the drawings.

Figure 16:
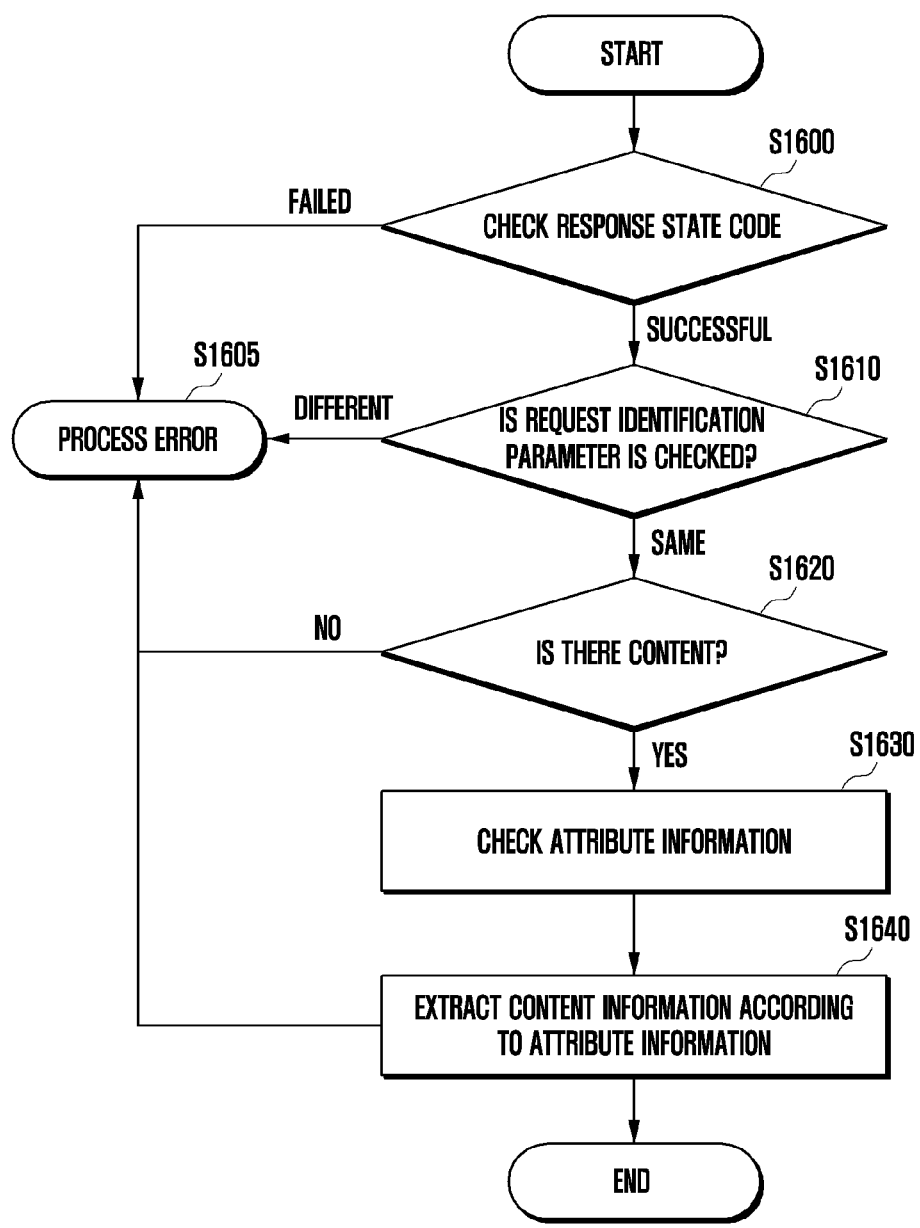
FIG. 16 illustrates an operation for extracting information from a response message according to a request message for retrieving time-series instance resources according to an embodiment.

FIG. 16 illustrates an operation for extracting information from a response message in response to a request message for retrieving time-series instance resources according to an embodiment.

Referring to FIG. 16, a request message originator receiving a response message checks a response state code of the response message in S1600. If the response state code is configured a value indicating successful processing of the request message, the originator checks whether the request identification parameter is the same as the request identification parameter of the request message in S1610. Sequences of steps S1600 and S1610 may be changed.

If it is determined that the request identification parameters are the same as each other on the basis of the determination result of step S1610, the originator determines whether there is content in S1620. If it is determined that there is content, the originator checks attribute information of target resources of the corresponding content in S1630.

For example, if the target resources are time-series resources, the originator identifies ContentInfo of the time-series resources and identifies information on at least one of the media type, the encoding type, and the content security type for the time-series resources.

In another example, if the target resources are time-series instance resources, the originator identifies ContentInfo attribute information of the time-series resources or ContInfo attribute information of the time-series resources that are higher resources and identifies information on at least one of the media type, the encoding type, and the content security type for the time-series instance resources.

In another example, if the target resources are content instance resources, the originator identifies ContentInfo attribute information of the time-series resources or ContInfo attribute information of the time-series resources that are higher resources and identifies information on at least one of the media type, the encoding type, and the content security type for the content instance resources.

Thereafter, the originator extracts content information according to type information of the identified attribute information in S1640. That is, the originator may prevent decoding failure and resources from being wasted in decoding by decoding content information on the basis of the media type, the encoding type, or the content security type specified by the attribute information.

Further, if the response state code indicates failure, the request identification parameters are not the same as each other, or there is no content in each of steps S1600, S1610, and S1620, the originator performs an error processing operation in S1605.

As described above, the target resources may include at least one piece of the media type information, the encoding type information, and the content security information as attribute information, and the M2M device may prevent decoding failure and unnecessary resource waste by decoding the target resources using the corresponding attribute information.

Hereinafter, the configuration of the M2M device capable of implementing all of the embodiments described with reference to FIGS. 1 to 16 is described once more with reference to the drawings.

Figure 17:
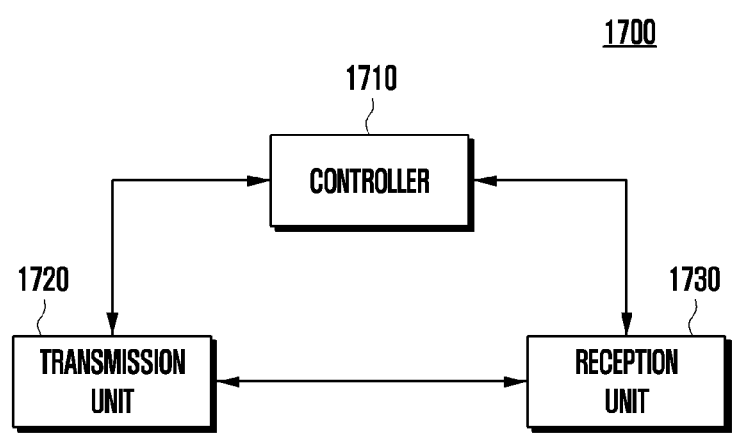
FIG. 17 illustrates a structure of the M2M device according to an embodiment.

FIG. 17 illustrates a structure of the M2M device according to an embodiment.

Referring to FIG. 17, a machine-to-machine communication (M2M) device 1700 may include a reception unit 1730 for receiving a request message including an operation parameter, a receiving side parameter, a transmitting side parameter, and a request identification parameter from another M2M device, a controller 1710 for processing target resources including attribute information indicating resource information according to an operation indicated by the operation parameter, and a transmission unit 1720 for transmitting a response message including response information for the request message.

For example, the request message includes necessary parameters such as a transmitting side parameter indicating an originator, a receiving side parameter indicating a receiver, an operation parameter indicating an operation type, and a request identification parameter for identifying a request and a response. The request message may further include a content parameter selectively according to each operation parameter. For example, a request message indicating an operation of "create" or "update" may include a content parameter for target resources to be created or content to be updated.

When the request message is received, the controller 1710 processes target resources on the basis of the operation parameter.

For example, attribute information may include at least one piece of media type information for the target resources, encoding type information, and content security type information. That is, the attribute information may include at least one piece of media type information for the target resources, encoding type information, and content security type information applied to the target resources.

Further, the target resources may be time-series resources or time-series instance resources that are lower subsidiary resources of the time-series resources. Alternatively, the target resources may be content instance resources. That is, the target resources may be resources stored and managed by the M2M device or lower subsidiary resources of the corresponding resources.

For example, the attribute information may be Contentinfo attribute information that is lower attribute information of the target resources, and Contentinfo attribute information may necessarily include media type information and encoding type information applied to the target resources and selectively include content security type information.

Meanwhile, the controller 1710 may use attribute information to process the target resources according to the operation parameter.

For example, if the operation parameter indicates "create", the controller 1710 may insert at least one piece of the mediate type information, the encoding type information, and the content security type information applied to the target resources into Contentinfo attribute information and configure the Contentinfo attribute information as lower attribute information of the target resources, so as to create the target resources.

In another example, if the operation parameter indicates "retrieve", the controller 1710 may specify target resources, to be retrieved, requested by the originator and specify Contentinfo attribute information that is attribute information applied to the corresponding target resources as information to be included in the response message.

If the operation parameter indicates "retrieve" or "notify", the transmission unit 1720 transmits a response message including target resources and attribute information. Meanwhile, the response message may include a response state code, and if the operation parameter indicates "create" or "delete", a response code state may be configured as a value indicating successful or failed processing of the corresponding operation.

In addition, the controller 1710 controls the overall operation of the M2M device 1700 according to management of information on the media type, the encoding type, and the content security type as attribute information with respect to the target resources according to the embodiment.

Further, the transmission unit 1720 and the reception unit 1730 are used to transmit and receive messages, signals, and data required for implementing the embodiment to and from at least one of the originator, another M2M device, another node included in the M2M system, and an application user terminal.

The terms, "system", "processor", "controller", "component", "module", "interface", "model", and "unit" in the specification may generally refer to computer-related entity hardware, a combination of hardware and software, software, or software being executed. For example, the above-described elements may be a process executed by a processor, a processor, a controller, a control processor, an entity, an executed thread, a program, and/or a computer, but are not limited thereto. For example, all of an application executed by a controller or a processor, the controller, or the processor may be elements. One or more elements may be within a process and/or an executed thread, and may be located in one system or distributed to two or more systems.

The standard details or standard documents mentioned in the above embodiments are omitted for the simplicity of the description of the specification, and constitute a part of the specification. Therefore, when a part of the contents of the standard details and the standard documents is added to the specifications or is disclosed in the claims, it should be construed as falling within the scope of the disclosure.

Although a preferred embodiment of the disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the disclosure have not been described for limiting purposes. The scope of the disclosure shall be construed on the basis of the accompanying claims in such a manner that all of the technical ideas included within the scope equivalent to the claims belong to the disclosure.

The invention claimed is:

1. A method of processing a message by a machine-to-machine communication (M2M) device, the method comprising:
   receiving a request message including an operation parameter, a receiving side parameter, a transmitting side parameter, and a request identification parameter from another M2M device;
   processing target resources including attribute information indicating resource information according to an operation indicated by the operation parameter; and
   transmitting a response message including response information for the request message,
   wherein the attribute information is Contentinfo attribute information, including at least one piece of media type information, encoding type information, and content security type information applied to the target resources, and
   wherein, when the operation parameter indicates "create," processing the target resources comprises inserting the at least one piece of the media type information, the encoding type information, and the content security type information applied to the target resources into the Contentinfo attribute information and determining the Contentinfo attribute information as lower attribute information of the target resources to create the target resources.

2. The method of claim 1, wherein the attribute information includes at least one piece of the media type information for the target resources, encoding type information, and content security type information.

3. The method of claim 1, wherein the target resources are time-series resources or time-series instance resources.

4. The method of claim 1, wherein the target resources are content instance resources.

5. The method of claim 1, wherein, when the operation parameter indicates "retrieve" or "notify," the response message includes the target resources and the attribute information.

6. The method of claim 1, wherein the response message includes a request identification parameter configured as a value equal to a value of the request identification parameter included in the request message.

7. A machine-to-machine communication (M2M) device for processing a message, the M2M device comprising:
   a reception unit configured to receive a request message including an operation parameter, a receiving side parameter, a transmitting side parameter, and a request identification parameter from another M2M device;
   a controller configured to process target resources including attribute information indicating resource information according to an operation indicated by the operation parameter; and
   a transmission unit configured to transmit a response message including response information for the request message,
   wherein the attribute information is Contentinfo attribute information, including at least one piece of media type information, encoding type information, and content security type information applied to the target resources, and
   wherein, when the operation parameter indicates "create," the controller is further configured to insert the at least one piece of the media type information, the encoding type information, and the content security type information applied to the target resources into the Contentinfo attribute information and determine the Contentinfo attribute information as lower attribute information of the target resources to create the target resources.

8. The M2M device of claim 7, wherein the attribute information includes at least one piece of the media type information for the target resources, encoding type information, and content security type information.

9. The M2M device of claim 7, wherein the target resources are time-series resources or time-series instance resources.

10. The M2M device of claim 7, wherein the target resources are content instance resources.

11. The M2M device of claim 7, wherein, when the operation parameter indicates "retrieve" or "notify," the response message includes the target resources and the attribute information.

12. The M2M device of claim 7, wherein the response message includes a request identification parameter configured as a value equal to a value of the request identification parameter included in the request message.

* * * * *